(12) United States Patent
    Liu

(10) Patent No.: US 12,688,661 B2
(45) Date of Patent: Jul. 21, 2026

(54) CONTROL METHOD AND APPARATUS BASED ON MIXED REALITY, ELECTRONIC DEVICE, AND STORAGE MEDIUM

(71) Applicant: Beijing Zitiao Network Technology Co., Ltd., Beijing (CN)

(72) Inventor: Zhipeng Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 116 days.

(21) Appl. No.: 18/806,280

(22) Filed: Aug. 15, 2024

(65) Prior Publication Data

US 2025/0061667 A1      Feb. 20, 2025

(30) Foreign Application Priority Data

Aug. 16, 2023    (CN) .......................... 202311035230.7

(51) Int. Cl.
G06T 19/00        (2011.01)
G06F 3/01        (2006.01)

(52) U.S. Cl.
CPC ............ G06T 19/006 (2013.01); G06F 3/013 (2013.01)

(58) Field of Classification Search
CPC .............................. G06T 19/006; G06F 3/013
See application file for complete search history.

(56) References Cited

U.S. PATENT DOCUMENTS

| | | | | |
|---|---|---|---|---|
| 2018/0275410 | A1* | 9/2018 | Yeoh .................. | G02B 27/0172 |
| 2019/0206119 | A1* | 7/2019 | Nam ........................ | G06T 15/08 |
| 2019/0331919 | A1* | 10/2019 | Huo ........................ | H04N 23/55 |
| 2021/0088790 | A1* | 3/2021 | Forster .............. | G02B 27/0176 |
| 2024/0386655 | A1* | 11/2024 | Peuhkurinen ........... | G06F 3/011 |

* cited by examiner

*Primary Examiner* — Daniel F Hajnik
*Assistant Examiner* — Jed-Justin Imperial

(57) ABSTRACT

The present disclosure provides a control method and apparatus based on mixed reality, an electronic device, and a storage medium. The control method based on mixed reality includes: collecting an image of a real scenario and gaze point information of a current user, and adjusting, based on the gaze point information of the current user, a density degree of a scenario grid corresponding to the real scenario in a mixed reality space; obtaining depth information of grid vertices of the adjusted scenario grid, and determining an occlusion relationship between a virtual object and the image of the real scenario based on the depth information of the grid vertices and depth information of the virtual object; and combining the virtual object and the image of the real scenario for display in the mixed reality space based on the occlusion relationship.

20 Claims, 3 Drawing Sheets

Collect an image of a real scenario and gaze point information of a current user, and adjust, based on the gaze point information of the current user, a density degree of a scenario grid corresponding to the real scenario in a mixed reality space ⟋ S11

Obtain depth information of grid vertices of the adjusted scenario grid, and determine an occlusion relationship between a virtual object and the real scenario based on the depth information of the grid vertices and depth information of the virtual object ⟋ S12

Combine the virtual object and the image of the real scenario for display in the mixed reality space based on the occlusion relationship between the virtual object and the real scenario ⟋ S13

Collect an image of a real scenario and gaze point information of a current user, and adjust, based on the gaze point information of the current user, a density degree of a scenario grid corresponding to the real scenario in a mixed reality space ⌐ S11

Obtain depth information of grid vertices of the adjusted scenario grid, and determine an occlusion relationship between a virtual object and the real scenario based on the depth information of the grid vertices and depth information of the virtual object ⌐ S12

Combine the virtual object and the image of the real scenario for display in the mixed reality space based on the occlusion relationship between the virtual object and the real scenario ⌐ S13

FIG. 2

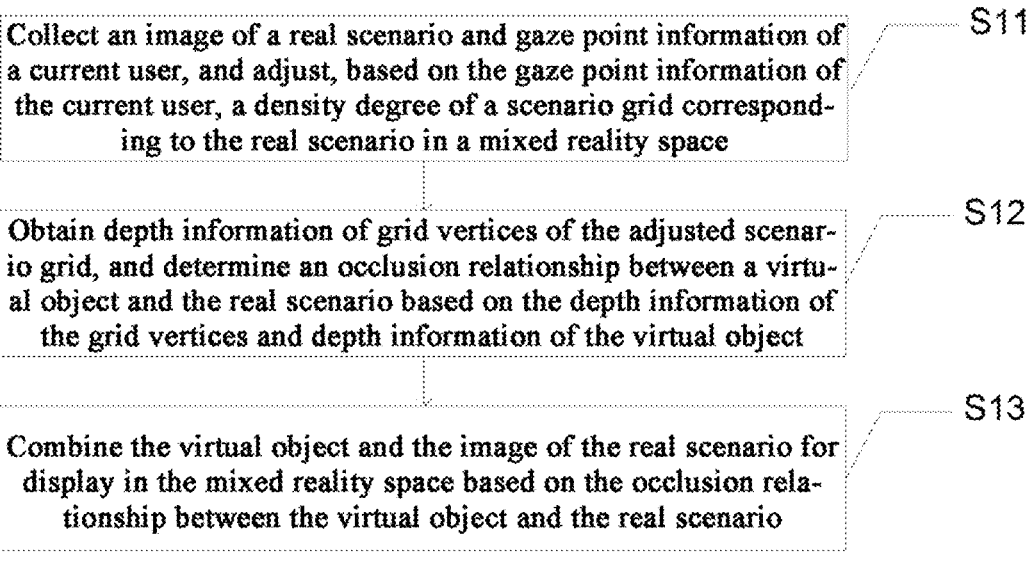
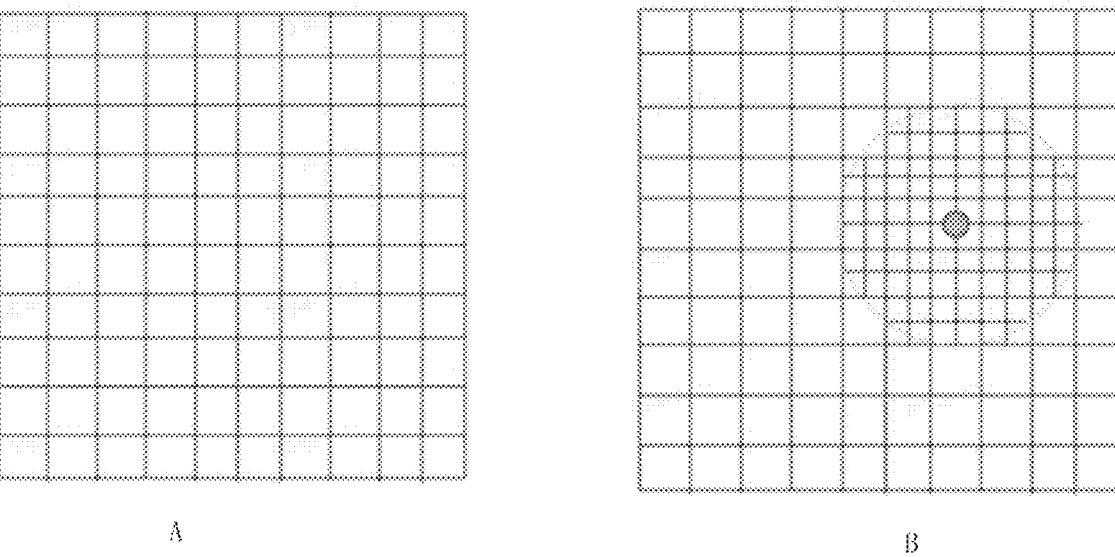

CONTROL METHOD AND APPARATUS BASED ON MIXED REALITY, ELECTRONIC DEVICE, AND STORAGE MEDIUM

CROSS-REFERENCE TO RELATED APPLICATION(S)

This application claims priority to Chinese Application No. 202311035230.7 filed Aug. 16, 2023, the disclosure of which is incorporated herein by reference in its entity.

FIELD

The present disclosure relates to the field of computer technology, and in particular to a control method and apparatus based on mixed reality, an electronic device, and a storage medium.

BACKGROUND

MR is short for mixed reality, namely a mixed reality technology. A mixed reality device can present users with a mixed reality space that combines real scenarios and virtual objects. The virtual objects need to be integrated with the real scenarios. To provide the users with immersive experience, it is necessary to achieve correct occlusion between the real scenarios and the virtual objects in the mixed reality space.

SUMMARY

The present disclosure provides a control method and apparatus based on mixed reality, an electronic device, and a storage medium.

The present disclosure uses the following technical solutions.

In some embodiments, the present disclosure provides a control method based on mixed reality, including:

collecting an image of a real scenario and gaze point information of a current user, and adjusting, based on the gaze point information of the current user, a density degree of a scenario grid corresponding to the real scenario in a mixed reality space;

obtaining depth information of grid vertices of the adjusted scenario grid, and determining an occlusion relationship between a virtual object and the image of the real scenario based on the depth information of the grid vertices and depth information of the virtual object; and combining the virtual object and the image of the real scenario for display in the mixed reality space based on the occlusion relationship between the virtual object and the image of the real scenario.

In some embodiments, the present disclosure provides a control apparatus based on mixed reality, including:

an collecting module, configured to collect an image of a real scenario and gaze point information of a current user, and adjust, based on the gaze point information of the current user, a density degree of a scenario grid corresponding to the real scenario;

a calculation module, configured to obtain depth information of grid vertices of the adjusted scenario grid, and determine an occlusion relationship between a virtual object and the image of the real scenario based on the depth information of the grid vertices and depth information of the virtual object; and a display module, configured to combine the virtual object and the image of the real scenario for display in a mixed reality space based on the occlusion relationship between the virtual object and the image of the real scenario.

In some embodiments, the present disclosure provides an electronic device, including at least one memory and at least one processor, where the memory is configured to store program code, and the processor is configured to invoke the program code stored in the memory to perform the above method.

In some embodiments, the present disclosure provides a computer-readable storage medium. The computer-readable storage medium is configured to store program code. The program code, when run by a processor, causes the processor to perform the above method.

According to the control method based on mixed reality provided by this embodiment of the present disclosure, gaze point tracking is introduced to dynamically adjust the depth grid of the perspective scenario, and the grid depth information of the real scenario and the depth information of the virtual object are compared for final combination and display on a screen, thereby achieving an occlusion effect. A fine virtual-real occlusion effect can be achieved near the current gaze point. Since only the grid density near the gaze point is refined, better user experience is achieved with little or no increase in calculation load.

BRIEF DESCRIPTION OF THE DRAWINGS

The above and other features, advantages, and aspects of various embodiments of the present disclosure will become more apparent in conjunction with the accompanying drawings and with reference to following specific implementations. Throughout the accompanying drawings, the same or similar reference numerals denote the same or similar elements. It should be understood that the accompanying drawings are illustrative, and components and elements may not necessarily be drawn to scale.

FIG. 2 is a flowchart of a control method based on mixed reality according to an embodiment of the present disclosure;

FIG. 3 is a schematic diagram of a scenario grid before and after adjustment according to an embodiment of the present disclosure;

DETAILED DESCRIPTION OF EMBODIMENTS

The embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. On the contrary, these embodiments are provided for a more thorough and complete understanding of the present disclosure.

It should be understood that the accompanying drawings and the embodiments of the present disclosure are for exemplary purposes only, and are not intended to limit the scope of protection of the present disclosure.

It should be understood that the steps recorded in the method implementations in the present disclosure may be performed in different orders and/or in parallel. In addition, additional steps may be included and/or the execution of the illustrated steps may be omitted in the method implementations. The scope of the present disclosure is not limited in this aspect.

The term "including" used herein and variations thereof are open-ended inclusions, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". Related definitions of other terms will be given in the description below.

It should be noted that concepts such as "first" and "second" mentioned in the present disclosure are only used to distinguish different apparatuses, modules, or units, and are not used to limit the order or relation of interdependence of functions performed by these apparatuses, modules, or units.

It should be noted that the modification of "a" mentioned in the present disclosure is illustrative rather than limiting, and those skilled in the art should understand that unless otherwise explicitly specified in the context, it should be interpreted as "one or more".

The names of messages or information exchanged between a plurality of apparatuses in the implementations of the present disclosure are provided for illustrative purposes only, and are not used to limit the scope of these messages or information.

The solutions provided by the embodiments of the present disclosure are described in detail in conjunction with the accompanying drawings below.

Figure 1:
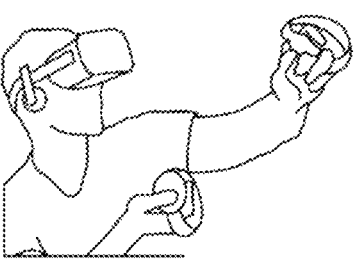
FIG. 1 is a schematic diagram of using a mixed reality device according to an embodiment of the present disclosure.

The method provided by the present disclosure may be used for a mixed reality device. As shown in FIG. 1, a user may enter a mixed reality space through a smart terminal device such as head-mounted glasses.

The mixed reality space may be a semi-simulated and semi-fictional virtual scenario. The virtual scenario may be any one of a two-dimensional virtual scenario, a 2.5-dimensional virtual scenario, or a three-dimensional virtual scenario, and this embodiment of the present disclosure does not limit the dimension of the virtual scenario. For example, the virtual scenario may include sky, land, ocean, etc., and the land may include environmental elements such as deserts and cities.

In an embodiment, in the mixed reality space, the user may achieve relevant interaction operations by an operating device. The operating device may be a gamepad. For example, the user performs relative operation control by operating buttons on the gamepad. Of course, in another embodiment, instead of using a controller, a gesture, voice, or multi-modal control method may be used to control a target object in the mixed reality device.

In some embodiments of the present disclosure, the provided method may be used for the mixed reality device, or may also be used for a terminal (e.g., a mobile phone, a tablet, a computer, and other devices) which is in communication connection with the mixed reality device. The mixed reality device is a terminal that achieves a mixed reality effect and may typically be provided as the form of glasses, a head mount display (HMD), and contact lenses, thereby achieving visual perception and perception of other forms. Of course, the achieved form of the mixed reality device is not limited to this, and may be further minimized or maximized according to needs.

The mixed reality device recorded in this embodiment of the present disclosure may include, but is not limited to, the following types:

a computer-end mixed reality device, utilizing a computer end for relevant calculations and data output related to mixed reality functions, where the external computer-end mixed reality device achieves a mixed reality effect by utilizing data output by the computer end;

a mobile mixed reality device, supporting various methods (e.g., arranging a head mount display with a special slot) of arranging a mobile terminal (e.g., a smartphone), where through wired or wireless connection with the mobile terminal, the mobile terminal performs relevant calculations for mixed reality functions and outputs data to the mobile mixed reality device, such as watching a mixed reality video through an application on the mobile terminal; and an all-in-one mixed reality device, provided with a processor for performing calculations related to virtual functions so as to have independent mixed reality input and output functions without being connected with the computer end or the mobile terminal, exhibiting a high degree of freedom in use.

In the mixed reality space, a virtual item model may interact with the real scenario, such as occlusion or collision. In a mixed reality application scenario, a virtual object (e.g., a virtual item) needs to be integrated with a real scenario (e.g., an item in a real environment) to be displayed. Therefore, it is necessary to achieve a correct occlusion relationship between the virtual object and the real scenario in the mixed reality space to ensure providing immersive experience for the user. In some embodiments, after dense three-dimensional reconstruction is performed on the real scenario to obtain complete depth information of the scenario, relatively fine occlusion processing may be achieved. However, the method has the defects of a large data volume, complex calculations, etc. In some other embodiments, the entire scenario is segmented according to a predefined sparse grid, and depth information of scenario grid vertices is obtained using a stereo vision principle. The depth information is stored in a depth buffer area and compared with a depth of the virtual item. A result is used as a basis for judging a virtual-real occlusion relationship. The method greatly reduces both the data volume and calculations. However, due to the sparsity of the scenario grid, an occlusion effect achieved is relatively rough, resulting in poor experience.

As shown in FIG. 2, FIG. 2 is a flowchart of a control method based on mixed reality according to an embodiment of the present disclosure. The following steps are included.

S11: Collect an image of a real scenario and gaze point information of a current user, and adjust, based on the gaze point information of the current user, a density degree of a scenario grid corresponding to the real scenario in a mixed reality space.

In some embodiments, the method provided by the present disclosure may be used for the mixed reality device, such as a head-mounted mixed display device. The image of the real scenario may be collected through a camera on the mixed reality device. The camera may be a binocular camera. The real scenario may be an environment scenario around the current user. The image of the real scenario may be an image of an environment around the current user, including images of houses, furniture, and other articles in the surrounding environment. The current user may be a user using the mixed reality device. Movement information of the eyeballs of the current user may be tracked through an eye-tracking camera, thereby determining the gaze point information of the current user. The gaze point information may include information, such as a direction at which the eyes of the current user gaze and/or a position on which the eyes focus. The mixed reality space may be a space presented to the current user. The image of the real scenario is about to be presented in the mixed reality space. The real scenario has a corresponding scenario grid in the mixed reality space. The scenario grid may be a grid after meshing the real scenario, and may be used to present the image of the real scenario using a general technology in the field of three-dimensional modeling. The scenario grid may be predefined, which may be a default scenario grid with 128×128 vertices. In some embodiments, the density degree of the scenario grid is related to the gaze point information of the current user. Specifically, the grid density in a projection area of the gaze point information on the scenario grid may be correlated with the gaze point information. Therefore, the density degree of the scenario grid may be correlated with whether the current user performs checking or not.

S12: Obtain depth information of grid vertices of the adjusted scenario grid, and determine an occlusion relationship between a virtual object and the image of the real scenario based on the depth information of the grid vertices and depth information of the virtual object.

In some embodiments, after the density degree of the scenario grid is adjusted, the depth information of the grid vertices in the scenario grid is obtained. The depth information may include a distance from the current user. The virtual object is a fictitious object that needs to be displayed in the mixed reality space, and has a displayed position preset or set by the current user in real time, and therefore the depth information of the virtual object can be known. After the depth information is obtained, the occlusion relationship between the real scenario and the virtual object is determined. The occlusion relationship may be used to describe whether the virtual object is occluded by an item in the real scenario, or whether the virtual object occludes the item in the real scenario.

S13: Combine the virtual object and the image of the real scenario for display in the mixed reality space based on the occlusion relationship between the virtual object and the image of the real scenario.

In some embodiments, the mixed reality space presents an image obtained after mixing the real scenario and the virtual object. Therefore, it is necessary to determine whether the virtual object is occluded by the item in the real scenario, or whether the item in the real scenario is occluded. In the mixed reality device, the collected image of the real scenario may be used as a background layer. When the virtual object is rendered, the virtual object is displayed based on the occlusion relationship. If the virtual object is occluded or partially occluded by the image of the real scenario, the occluded part may not be displayed in the mixed reality space. If part of the item in the mixed reality space is occluded by the virtual object, an image of the occluded part of the item may not be displayed in the mixed reality space.

In some embodiments of the present disclosure, in the mixed display application scenario, the occlusion relationship between the virtual object and the real scenario is correctly recognized, and then correct display processing is performed based on the occlusion relationship. For the scenario grid of the real scenario, the density degree of the scenario grid is automatically adjusted based on the gaze point information of the current user, such that drawing the scenario grid is correlated to whether the current user performs checking or not, thereby making resources consumed by drawing the scenario grid dynamically change, and better meeting user expectations.

In some embodiments of the present disclosure, the adjusting, based on the gaze point information of the current user, a density degree of a scenario grid corresponding to the real scenario in a mixed reality space includes: determining a projection area of the gaze point information on the scenario grid; and increasing the grid density of the scenario grid in the projection area, and maintaining or reducing the grid density of the scenario grid outside the projection area.

In some embodiments, a gaze point of the eyes of the current user is directed towards a gaze area in the mixed reality space (e.g., a circular area with a preset radius centered on the gaze point may be used as a gaze area). An area corresponding to the gaze area in the scenario grid may be used as the projection area, or an area corresponding to the gaze area in the scenario grid and an area with a preset size around the corresponding area may be used as the projection area. The projection area represents an area that the current user directly observes in the mixed reality space. Therefore, in this embodiment, by increasing the grid density of the scenario grid in the projection area, the determination of the occlusion relationship between the image of the real scenario corresponding to the projection area and the virtual object becomes more precise and accurate. Moreover, due to the increased grid density, a display effect of the final image presented is also more refined, thereby achieving better user experience. For the scenario grid in other areas outside the projection area, the grid density is maintained or reduced. Therefore, on one hand, computational consumption can be reduced, and stuttering is avoided. On the other hand, because the current user cannot directly watch these areas, the reduction of the grid density cannot reduce the use experience of the user. In some embodiments, as shown in FIG. 3, FIG. 3(A) schematically shows a scenario grid with a density degree unadjusted, and in this case, the grid density may be uniform. A dot shown in FIG. 3(B) is used as a gaze point of the current user, and a circular area centered on the dot is a projection area of gaze point information. As can be seen, the grid density in the projection area is increased, while the grid density in other areas remains unchanged.

In some embodiments of the present disclosure, the determining an occlusion relationship between a virtual object and the image of the real scenario based on the depth information of the grid vertices and depth information of the virtual object includes: determining a depth of the real scenario based on the depth information of the grid vertices; and determining the occlusion relationship based on a depth of the virtual object and the depth of the real scenario.

In some embodiments, the depth information may refer to a distance from the current user in the mixed reality space. The distance between the real scenario in the real space and the current user may be the same as the distance between the image of the real scenario in the mixed reality space and the current user. That is, in the mixed reality space, the real scenario in the real space may be replicated into the mixed reality space. Generally speaking, if an item is close to the current user, the item occludes an item that is far away from the current user. The depth information of the scenario grid may be determined using a stereo vision ranging method. Specifically, a binocular ranging method may be used to detect a distance from a position corresponding to a grid vertexin the real scenario to the current user so as to determine the depth information of the corresponding grid-vertex. Then, the depth information of the real scenario may be obtained through interpolation using the depth information of the grid vertex, without the need to detect the depth information of every position in the real scenario. Subsequently, a depth test is performed on the depth information of the virtual object and the depth information of the real scenario, and an obtained test result is used as a basis for determining the occlusion relationship.

In some embodiments, the determining an occlusion relationship based on the depth of the virtual object and the depth of the real scenario includes: determining that the virtual object is occluded by the real scenario if the depth of the real scenario is less than the depth of the virtual object, indicating that the real scenario is closer to the current user; or, determining that the virtual object is not occluded by the real scenario if the depth of the real scenario is not less than the depth of the virtual object.

In some embodiments of the present disclosure, the combining the virtual object and the image of the real scenario for display in the mixed reality space includes: displaying the image of the real scenario without displaying the virtual object if the occlusion relationship indicates that the virtual object is occluded by the real scenario; or, displaying the virtual object with the image of the real scenario displayed as a background if the occlusion relationship indicates that the virtual object is not occluded by the real scenario.

In some embodiments, when the depth of the real scenario is less than the depth of the virtual object, the virtual object needs to be occluded, and in this case, the virtual object needs to be removed from the mixed reality space to reveal the image of the real scenario, thereby achieving an effect that the virtual object is occluded by the real scenario; and conversely, the virtual object does not need to be removed, thereby achieving an effect that the virtual object obscures the real scenario.

In some embodiments of the present disclosure, the combining the virtual object and the image of the real scenario for display in the mixed reality space includes: determining three-dimensional coordinate information of grid vertices of the scenario grid, and displaying the image of the real scenario in the mixed reality space based on the three-dimensional coordinate information.

In some embodiments, the three-dimensional coordinate information of the grid vertices of the scenario grid in the mixed reality space needs to be determined, then, the grid vertices are positioned in the mixed reality space, and based on the positioned grid vertices, a display position of the image of the real scenario is determined, and then the corresponding image of the real scenario is displayed.

In some embodiments, based on camera parameters of the camera for collecting the image of the real scenario, the three-dimensional coordinate information of the grid vertices in the mixed reality space is determined.

In some embodiments, the camera parameters may include information such as a focal length and orientation of the camera. The camera may be a binocular camera. Through the camera parameters during camera shooting, a relative position between each site in the real scenario and the camera may be determined, and a position relationship between the site in the real scenario and the current user is usually the same as a position relationship of the grid vertex corresponding to the site in the mixed reality space, thereby achieving the replicated display of the real scenario in the mixed reality space. Therefore, when the position in the real scenario is obtained, the position of each grid vertex in the corresponding scenario grid may be known, thereby obtaining the three-dimensional coordinate information of the grid vertices of the scenario grid in the mixed reality space through conversion.

To better describe the method provided by this embodiment of the present disclosure, a specific embodiment is provided in conjunction with FIG. 4 below. In this embodiment, the mixed reality device obtains the eyeball gaze point information of the current user in real time during operation, and dynamically adjusts the density degree of the scenario grid, that is, the density degree of a grid within a certain range close to a gaze point of the current user is increased, and the density degree of a grid away from the gaze point is unchanged. Then, the stereo vision principle is used to obtain the depth information of the dynamically-adjusted scenario grid vertices and calculate three-dimensional coordinates of the grid vertices, and the depth information is stored in a depth buffer area and is used to be compared with the depth of the virtual item. A comparison result is used as a basis for determining the occlusion relationship between the virtual object and the image of the real scenario. If the depth of the scenario grid is less than the depth of the virtual object, the background of the real scenario is displayed, and conversely, the virtual object is displayed. Finally, a relatively fine virtual-real occlusion effect is achieved near the gaze point of the user. The area far away from the gaze point has limited impact on visual experience of the user, and therefore the occlusion effect does not need to be too fine.

The mixed reality device in this embodiment may include three modules: an collecting module, a calculation module, and a display module.

The collecting module is configured to collect the image of the real scenario in real time using a camera carried by a head mount display device, and meanwhile use an eye-tracking camera to track eyeball movement information, and transmit collected data information and relevant camera parameters to a data calculation processing module for processing.

The calculation module is configured to calculate gaze point information of the current user using the collected image data and relevant camera parameters, and determine a position of a gaze point projected onto a grid; adjust the density degree of the predefined scenario grid (e.g., a grid with $128 \times 128$ vertices) using the gaze point information, namely increase the density degree (e.g., doubling the original grid density) of a local area near the gaze point, shown in FIG. 3; and obtain a depth of the adjusted scenario grid vertices using a stereo vision ranging method (e.g., binocular ranging), namely the grid depth of the real scenario captured by the camera, and finally obtain three-dimensional coordinate information of the grid vertices.

The display module is configured to render a virtual item (the virtual object in this embodiment) using the image captured by the camera as a background layer, which requires a depth test on the depth of the virtual item and the depth of the scenario (obtained through interpolation using the depth of the grid vertices), and uses a test result as a basis for whether to remove the virtual item so as to achieve a virtual-real occlusion effect. For example, when the depth of the real scenario is less than the depth of the virtual item, the virtual item needs to be occluded, and in this case, the virtual item needs to be removed to reveal the background layer of the real scenario, thereby achieving an effect that the virtual item is occluded by the real scenario; and conversely, the virtual item does not need to be removed, thereby achieving an effect that the virtual item occludes the real scenario.

Figures 4, 5:
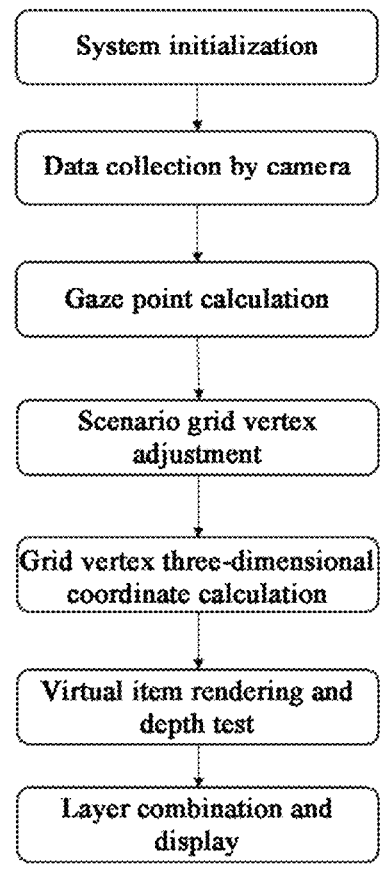
FIG. 4 is a flowchart of a control method based on mixed reality according to an embodiment of the present disclosure.
FIG. 5 is a structural schematic diagram of an electronic device according to an embodiment of the present disclosure.

Operating steps of the mixed reality device are shown in FIG. 4.

A system performs initialization work, completes configuration of relevant modules and parameters, and adjusts the state of all required modules to a ready state.

The camera (including the eye-tracking camera) collects data for preprocessing, and image information and relevant parameters collected by a video camera are transmitted to a data calculation module for processing.

The gaze point of the current user is calculated, and the vertex density of the predefined scenario grid is adjusted based on the position of the gaze point.

The depth value of the grid vertices is calculated, and coordinates of the scenario grid in a three-dimensional space of the mixed reality space are calculated using the camera parameters.

The virtual item is rendered, the depth test is performed on the virtual item and the scenario three-dimensional grid, a part of the virtual item that is occluded by the real scenario is removed, a background image of the real scenario and the virtual item are combined, and a combined result is displayed on a screen.

In some embodiments of the present disclosure, gaze point tracking is introduced to dynamically adjust the depth grid of the perspective scenario, and refine the occlusion effect near the gaze point. The image of the real scenario is used as the background layer, the grid depth information of the real scenario and the depth information of the virtual item are compared, and the occluded part of the virtual item is removed for final combination and display on the screen, thereby achieving the occlusion effect. The fine virtual-real occlusion effect can be achieved near the current gaze point. Since only the grid density near the gaze point is refined, better user experience is achieved without a small increase in calculation load.

The present disclosure further provides a control apparatus based on mixed reality, including:

an collecting module, configured to collect an image of a real scenario and gaze point information of a current user, and adjust, based on the gaze point information of the current user, a density degree of a scenario grid corresponding to the real scenario;

a calculation module, configured to obtain depth information of grid vertices of the adjusted scenario grid, and determine an occlusion relationship between a virtual object and the image of the real scenario based on the depth information of the grid vertices and depth information of the virtual object; and a display module, configured to combine the virtual object and the image of the real scenario for display in a mixed reality space based on the occlusion relationship between the virtual object and the image of the real scenario.

In some embodiments, the adjusting, based on the gaze point information of the current user, a density degree of a scenario grid corresponding to the real scenario in a mixed reality space includes:

determining a projection area of the gaze point information on the scenario grid; and increasing the grid density of the scenario grid in the projection area, and maintaining or reducing the grid density of the scenario grid outside the projection area.

In some embodiments, the determining an occlusion relationship between a virtual object and the image of the real scenario based on the depth information of the grid vertices and depth information of the virtual object includes:

determining a depth of the real scenario based on the depth information of the grid vertices; and determining the occlusion relationship based on a depth of the virtual object and the depth of the real scenario.

In some embodiments, the determining the occlusion relationship based on a depth of the virtual object and the depth of the real scenario includes:

determining that the virtual object is occluded by the real scenario if the depth of the real scenario is less than the depth of the virtual object; or, determining that the virtual object is not occluded by the real scenario if the depth of the real scenario is not less than the depth of the virtual object.

In some embodiments, the combining the virtual object and the image of the real scenario for display in a mixed reality space includes:

displaying the image of the real scenario without displaying the virtual object if the occlusion relationship indicates that the virtual object is occluded by the real scenario; or, displaying the virtual object with the image of the real scenario displayed as a background if the occlusion relationship indicates that the virtual object is not occluded by the real scenario.

In some embodiments, the combining the virtual object and the image of the real scenario for display in a mixed reality space includes:

determining three-dimensional coordinate information of the grid vertices of the scenario grid, and displaying the image of the real scenario in the mixed reality space based on the three-dimensional coordinate information.

In some embodiments, the determining three-dimensional coordinate information of the grid vertices of the scenario grid includes:

determining the three-dimensional coordinate information of the grid vertices in the mixed reality space based on camera parameters of a camera for collecting the image of the real scenario.

Because the embodiment of the apparatus basically corresponds to the method embodiment, reference is made to the partial description of the method embodiment for relevant parts. The apparatus embodiment described above is merely illustrative, and the modules described as separate modules may or may not be separate. Some or all of the modules may be selected according to actual needs to achieve the objectives of the solution of this embodiment. Those of ordinary skill in the art may understand and implement it without creative work.

The above is a description of the method and the apparatus of the present disclosure based on the embodiments and application examples. In addition, the present disclosure further provides an electronic device and a computer-readable storage medium. The electronic device and the computer-readable storage medium are described below.

Referring to FIG. 5 below, FIG. 5 is a structural schematic diagram of an electronic device (e.g., a terminal device or a server) 800 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a portable Android device (PAD), a portable media player (PMP), and a vehicle-mounted terminal (e.g., a vehicle navigation terminal), and fixed terminals such as a digital TV and a desktop computer. The electronic device shown in the figure is merely an example, which should not impose any limitations on functions and application ranges of this embodiment of the present disclosure.

The electronic device 800 may include a processing apparatus (e.g., a central processing unit and a graphics processing unit) 801 that may perform various suitable actions and processes based on a program stored in a read-only memory (ROM) 802 or a program loaded from a storage apparatus 808 into a random access memory (RAM) 803. The RAM 803 further stores various programs and data needed by the operation of the electronic device 800. The processing apparatus 801, the ROM 802, and the RAM 803 are connected to one another through a bus 804. An input/output (I/O) interface 805 is also connected to the bus 804.

Typically, the following apparatuses may be connected to the I/O interface 805: an input apparatus 806, including, for example, a touchscreen, a touchpad, a keyboard, a mouse, a camera, a microphone, an accelerometer, and a gyroscope; an output apparatus 807, including, for example, a liquid crystal display (LCD), a speaker, and a vibrator; the storage apparatus 808, including, for example, a magnetic tape and a hard drive; and a communication apparatus 809. The communication apparatus 809 may allow the electronic device 800 to be in wireless or wired communication with other devices for data exchange. Although the figure illustrates the electronic device 800 with various apparatuses, it should be understood that it is not necessary to implement or have all the shown apparatuses. It may be an alternative to implement or have more or fewer apparatuses.

Particularly, the foregoing process described with reference to the flowcharts according to the embodiments of the present disclosure may be implemented as a computer software program. For example, an embodiment of the present disclosure includes a computer program product including a computer program carried on a computer-readable medium. The computer program includes program code for performing the method shown in the flowchart. In this embodiment, the computer program may be downloaded and installed from the network through the communication apparatus 809, or installed from the storage apparatus 808, or installed from the ROM 802. The computer program, when executed by the processing apparatus 801, performs the above functions defined in the method in the embodiments of the present disclosure.

It should be noted that the computer-readable medium in the present disclosure may be either a computer-readable signal medium or a computer-readable storage medium, or any combination of the two. The computer-readable storage medium may be, for example, but is not limited to, electric, magnetic, optical, electromagnetic, infrared, or semiconductor systems, apparatuses, or devices, or any combination of the above. More specific examples of the computer-readable storage medium may include, but are not limited to: an electrical connection with one or more wires, a portable computer disk, a hard drive, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above. In the present disclosure, the computer-readable storage medium may be any tangible medium including or storing a program, and the program may be used by or in conjunction with an instruction execution system, apparatus, or device. However, in the present disclosure, the computer-readable signal medium may include a data signal propagated in a baseband or as a part of a carrier, where the data signal carries computer-readable program code. The propagated data signal may take various forms, including but not limited to an electromagnetic signal, an optical signal, or any suitable combination of the above. The computer-readable signal medium may also be any computer-readable medium other than the computer-readable storage medium. The computer-readable signal medium may send, propagate, or transmit a program for use by or for use in conjunction with the instruction execution system, apparatus, or device. The program code included in the computer-readable medium may be transmitted by any suitable medium including but not limited to a wire, an optical cable, radio frequency (RF), etc., or any suitable combination of the above.

In some implementations, a client and a server may communicate using any currently known or future-developed network protocols such as a hypertext transfer protocol (HTTP), and may also be interconnected with digital data communication in any form or medium (e.g., a communication network). Examples of the communication network include a local area network ("LAN"), a wide area network ("WAN"), an internetwork (e.g., the Internet), a peer-to-peer network (e.g., an ad hoc peer-to-peer network), and any currently known or future-developed network.

The computer-readable medium may be included in the above electronic device; or may also separately exist without being assembled in the electronic device.

The computer-readable medium carries one or more programs. The one or more programs, when executed by the electronic device, cause the electronic device to perform the above method of the present disclosure.

The computer program code for performing the operations of the present disclosure may be written in one or more programming languages or a combination thereof. The programming languages include object-oriented programming languages such as Java, Smalltalk, and C++, and further include conventional procedural programming languages such as "C" language or similar programming languages. The program code may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a local area network (LAN) or a wide area network (WAN), or may be connected to an external computer (e.g., utilizing an Internet service provider for Internet connectivity).

The flowcharts and the block diagrams in the accompanying drawings illustrate the possibly implemented system architecture, functions, and operations of the system, the method, and the computer program product according to the various embodiments of the present disclosure. In this regard, each block in the flowcharts or the block diagrams may represent a module, a program segment, or a part of code, and the module, the program segment, or the part of code includes one or more executable instructions for implementing specified logic functions. It should also be noted that in some alternative implementations, the functions marked in the blocks may also occur in an order different from that marked in the accompanying drawings. For example, two blocks shown in succession may actually be performed substantially in parallel, or may sometimes be performed in a reverse order, depending on functions involved. It should also be noted that each block in the block diagrams and/or the flowcharts, and a combination of the blocks in the block diagrams and/or the flowcharts may be implemented by using a dedicated hardware-based system that performs specified functions or operations, or may be implemented by using a combination of dedicated hardware and computer instructions.

The related units described in the embodiments of the present disclosure may be implemented by software or hardware. The name of the unit does not limit the unit in certain cases.

Herein, the functions described above may be at least partially executed by one or more hardware logic components. For example, without limitation, exemplary hardware logic components that can be used include: a field-programmable gate array (FPGA), an application specific integrated circuit (ASIC), an application specific standard part (ASSP), a system on chip (SOC), a complex programmable logic device (CPLD), etc.

In the context of the present disclosure, a machine-readable medium may be a tangible medium that may include or store a program for use by or for use in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include an electrical connection based on one or more wires, a portable computer disk, a hard drive, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above content.

According to one or more embodiments of the present disclosure, a control method based on mixed reality is provided, and includes:

collecting an image of a real scenario and gaze point information of a current user, and adjusting, based on the gaze point information of the current user, a density degree of a scenario grid corresponding to the real scenario in a mixed reality space;

obtaining depth information of grid vertices of the adjusted scenario grid, and determining an occlusion relationship between a virtual object and the image of the real scenario based on the depth information of the grid vertices and depth information of the virtual object; and combining the virtual object and the image of the real scenario for display in the mixed reality space based on the occlusion relationship between the virtual object and the image of the real scenario.

According to one or more embodiments of the present disclosure, a control method based on mixed reality is provided. The adjusting, based on the gaze point information of the current user, a density degree of a scenario grid corresponding to the real scenario in a mixed reality space includes:

determining a projection area of the gaze point information on the scenario grid; and increasing the grid density of the scenario grid in the projection area, and maintaining or reducing the grid density of the scenario grid outside the projection area.

According to one or more embodiments of the present disclosure, a control method based on mixed reality is provided. The determining an occlusion relationship between a virtual object and the image of the real scenario based on the depth information of the grid vertices and depth information of the virtual object includes:

determining a depth of the real scenario based on the depth information of the grid vertices; and determining the occlusion relationship based on a depth of the virtual object and the depth of the real scenario.

According to one or more embodiments of the present disclosure, a control method based on mixed reality is provided. Determining the occlusion relationship based on the depth of the virtual object and the depth of the real scenario includes:

determining that the virtual object is occluded by the real scenario if the depth of the real scenario is less than the depth of the virtual object; or, determining that the virtual object is not occluded by the real scenario if the depth of the real scenario is not less than the depth of the virtual object.

According to one or more embodiments of the present disclosure, a control method based on mixed reality is provided. The combining the virtual object and the image of the real scenario for display in the mixed reality space includes:

displaying the image of the real scenario without displaying the virtual object if the occlusion relationship indicates that the virtual object is occluded by the real scenario; or, displaying the virtual object with the image of the real scenario displayed as a background if the occlusion relationship indicates that the virtual object is not occluded by the real scenario.

According to one or more embodiments of the present disclosure, a control method based on mixed reality is provided. The combining the virtual object and the image of the real scenario for display in the mixed reality space includes:

determining three-dimensional coordinate information of the grid vertices of the scenario grid, and displaying the image of the real scenario in the mixed reality space based on the three-dimensional coordinate information.

According to one or more embodiments of the present disclosure, a control method based on mixed reality is provided. The determining three-dimensional coordinate information of the grid vertices of the scenario grid includes:

determining the three-dimensional coordinate information of the grid vertices in the mixed reality space based on camera parameters of a camera for collecting the image of the real scenario.

According to one or more embodiments of the present disclosure, a control apparatus based on mixed reality is provided, and includes:

an collecting module, configured to collect an image of a real scenario and gaze point information of a current user, and adjust, based on the gaze point information of the current user, a density degree of a scenario grid corresponding to the real scenario;

a calculation module, configured to obtain depth information of grid vertices of the adjusted scenario grid, and determine an occlusion relationship between a virtual object and the image of the real scenario based on the depth information of the grid vertices and depth information of the virtual object; and a display module, configured to combine the virtual object and the image of the real scenario for display in a mixed reality space based on the occlusion relationship between the virtual object and the image of the real scenario.

According to one or more embodiments of the present disclosure, an electronic device is provided, and includes at least one memory and a least one processor, where the at least one memory is used to store program code, and the at least one processor is used to invoke the program code stored in the at least one memory to perform any one of the above methods.

According to one or more embodiments of the present disclosure, a computer-readable storage medium is provided. The computer-readable storage medium is used to store program code. The program code, when running on a processor, causes the processor to perform the above method.

What are described above are only preferred embodiments of the present disclosure and explanations of the technical principles applied. Those skilled in the art should understand that the scope of the disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure, such as a technical solution formed by replacing the foregoing features with the technical features with similar functions disclosed (but not limited to) in the present disclosure.

Further, although the operations are described in a particular order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the present disclosure. Some features that are described in the context of separate embodiments may also be implemented in combination in a single embodiment. In contrast, various features described in the context of a single embodiment may also be implemented in a plurality of embodiments separately or in any suitable sub-combination.

Although the subject matter has been described in a language specific to structural features and/or logic actions of the method, it should be understood that the subject matter defined in the appended claims is not necessarily limited to the specific features or actions described above. On the contrary, the specific features and the actions described above are merely example forms for implementing the claims.

I claim:

1. A control method based on mixed reality, comprising:

collecting an image of a real scenario and gaze point information of a current user, and adjusting, based on the gaze point information of the current user, a density degree of a scenario grid corresponding to the real scenario in a mixed reality space;

obtaining depth information of grid vertices of the adjusted scenario grid, and determining an occlusion relationship between a virtual object and the image of the real scenario based on the depth information of the grid vertices and depth information of the virtual object; and combining the virtual object and the image of the real scenario for display in the mixed reality space based on the occlusion relationship between the virtual object and the image of the real scenario.

2. The method according to claim 1, wherein adjusting, based on the gaze point information of the current user, a density degree of a scenario grid corresponding to the real scenario in a mixed reality space comprises:

determining a projection area of the gaze point information on the scenario grid; and increasing the grid density of the scenario grid in the projection area, and maintaining or reducing the grid density of the scenario grid outside the projection area.

3. The method according to claim 1, wherein determining an occlusion relationship between a virtual object and the image of the real scenario based on the depth information of the grid vertices and depth information of the virtual object comprises:

determining a depth of the real scenario based on the depth information of the grid vertices; and determining the occlusion relationship based on a depth of the virtual object and the depth of the real scenario.

4. The method according to claim 3, wherein determining the occlusion relationship based on a depth of the virtual object and the depth of the real scenario comprises:

determining that the virtual object is occluded by the real scenario in response to the depth of the real scenario being less than the depth of the virtual object; or, determining that the virtual object is not occluded by the real scenario in response to the depth of the real scenario being not less than the depth of the virtual object.

5. The method according to claim 1, wherein combining the virtual object and the image of the real scenario for display in the mixed reality space comprises:

displaying the image of the real scenario without displaying the virtual object in response to the occlusion relationship indicating that the virtual object is occluded by the real scenario; or, displaying the virtual object with the image of the real scenario displayed as a background in response to the occlusion relationship indicating that the virtual object is not occluded by the real scenario.

6. The method according to claim 1, wherein combining the virtual object and the image of the real scenario for display in the mixed reality space comprises:

determining three-dimensional coordinate information of the grid vertices of the scenario grid, and displaying the image of the real scenario in the mixed reality space based on the three-dimensional coordinate information.

7. The method according to claim 6, wherein determining three-dimensional coordinate information of the grid vertices of the scenario grid comprises:

determining the three-dimensional coordinate information of the grid vertices in the mixed reality space based on camera parameters of a camera for collecting the image of the real scenario.

8. An electronic device, comprising:

at least one memory and at least one processor, wherein the at least one memory is configured to store program code, and the at least one processor is configured to invoke the program code stored in the at least one memory, and the program code, when executed by the at least one processor, causes the electronic device to:

collect an image of a real scenario and gaze point information of a current user, and adjust, based on the gaze point information of the current user, a density degree of a scenario grid corresponding to the real scenario in a mixed reality space;

obtain depth information of grid vertices of the adjusted scenario grid, and determine an occlusion relationship between a virtual object and the image of the real scenario based on the depth information of the grid vertices and depth information of the virtual object; and combine the virtual object and the image of the real scenario for display in the mixed reality space based on the occlusion relationship between the virtual object and the image of the real scenario.

9. The electronic device according to claim 8, wherein the program code causing the electronic device to adjust, based on the gaze point information of the current user, a density degree of a scenario grid corresponding to the real scenario in a mixed reality space further causes the electronic device to:

determine a projection area of the gaze point information on the scenario grid; and increase the grid density of the scenario grid in the projection area, and maintain or reduce the grid density of the scenario grid outside the projection area.

10. The electronic device according to claim 8, wherein the program code causing the electronic device to determine an occlusion relationship between a virtual object and the image of the real scenario based on the depth information of the grid vertices and depth information of the virtual object further causes the electronic device to:

determine a depth of the real scenario based on the depth information of the grid vertices; and determine the occlusion relationship based on a depth of the virtual object and the depth of the real scenario.

11. The electronic device according to claim 10, wherein the program code causing the electronic device to determine the occlusion relationship based on a depth of the virtual object and the depth of the real scenario further causes the electronic device to:

determine that the virtual object is occluded by the real scenario in response to the depth of the real scenario being less than the depth of the virtual object; or, determine that the virtual object is not occluded by the real scenario in response to the depth of the real scenario being not less than the depth of the virtual object.

12. The electronic device according to claim 8, wherein the program code causing the electronic device to combine the virtual object and the image of the real scenario for display in the mixed reality space further causes the electronic device to:

display the image of the real scenario without displaying the virtual object in response to the occlusion relationship indicating that the virtual object is occluded by the real scenario; or, display the virtual object with the image of the real scenario displayed as a background in response to the occlusion relationship indicating that the virtual object is not occluded by the real scenario.

13. The electronic device according to claim 8, wherein the program code causing the electronic device to combine the virtual object and the image of the real scenario for display in the mixed reality space further causes the electronic device to:

determine three-dimensional coordinate information of the grid vertices of the scenario grid, and display the image of the real scenario in the mixed reality space based on the three-dimensional coordinate information.

14. The electronic device according to claim 13, wherein the program code causing the electronic device to determine three-dimensional coordinate information of the grid vertices of the scenario grid further causes the electronic device to:

determine the three-dimensional coordinate information of the grid vertices in the mixed reality space based on camera parameters of a camera for collecting the image of the real scenario.

15. A non-transitory computer-readable storage medium, wherein the non-transitory computer-readable storage medium is configured to store program code, and the program code, when executed by a processor, causes the processor to:

collect an image of a real scenario and gaze point information of a current user, and adjust, based on the gaze point information of the current user, a density degree of a scenario grid corresponding to the real scenario in a mixed reality space;

obtain depth information of grid vertices of the adjusted scenario grid, and determine an occlusion relationship between a virtual object and the image of the real scenario based on the depth information of the grid vertices and depth information of the virtual object; and combine the virtual object and the image of the real scenario for display in the mixed reality space based on the occlusion relationship between the virtual object and the image of the real scenario.

16. The non-transitory computer-readable storage medium according to claim 15, wherein the program code causing the processor to adjust, based on the gaze point information of the current user, a density degree of a scenario grid corresponding to the real scenario in a mixed reality space further causes the processor to:

determine a projection area of the gaze point information on the scenario grid; and increase the grid density of the scenario grid in the projection area, and maintain or reduce the grid density of the scenario grid outside the projection area.

17. The non-transitory computer-readable storage medium according to claim 15, wherein the program code causing the processor to determine an occlusion relationship between a virtual object and the image of the real scenario based on the depth information of the grid vertices and depth information of the virtual object further causes the processor to:

determine a depth of the real scenario based on the depth information of the grid vertices; and determine the occlusion relationship based on a depth of the virtual object and the depth of the real scenario.

18. The non-transitory computer-readable storage medium according to claim 17, wherein the program code causing the processor to determine the occlusion relationship based on a depth of the virtual object and the depth of the real scenario further causes the processor to:

determine that the virtual object is occluded by the real scenario in response to the depth of the real scenario being less than the depth of the virtual object; or, determine that the virtual object is not occluded by the real scenario in response to the depth of the real scenario being not less than the depth of the virtual object.

19. The non-transitory computer-readable storage medium according to claim 15, wherein the program code causing the processor to combine the virtual object and the image of the real scenario for display in the mixed reality space further causes the processor to:

display the image of the real scenario without displaying the virtual object in response to the occlusion relationship indicating that the virtual object is occluded by the real scenario; or, display the virtual object with the image of the real
scenario displayed as a background in response to the
occlusion relationship indicating that the virtual object
is not occluded by the real scenario.

20. The non-transitory computer-readable storage
medium according to claim 15, wherein the program code
causing the processor to combine the virtual object and the
image of the real scenario for display in the mixed reality
space further causes the processor to:

determine three-dimensional coordinate information of
the grid vertices of the scenario grid, and display the
image of the real scenario in the mixed reality space
based on the three-dimensional coordinate information.

\* \* \* \* \*